United States Patent [19]

Sempe

[11] Patent Number: 5,363,417
[45] Date of Patent: Nov. 8, 1994

[54] CLOCK SLIP COUNTING PROCESS AND APPARATUS

[75] Inventor: Christian Sempe, Blagnac, France

[73] Assignee: France Telecom Etablissement Autonome de Droit Public, Paris, France

[21] Appl. No.: 961,660

[22] Filed: Oct. 16, 1992

[30] Foreign Application Priority Data

Oct. 18, 1991 [FR] France ................... 91 12895

[51] Int. Cl.⁵ .............................. H04L 7/00
[52] U.S. Cl. ................... 375/114; 370/105.1; 370/105.4
[58] Field of Search .......... 375/94, 114, 116, 118–119; 370/105.1, 105.4, 106

[56] References Cited

U.S. PATENT DOCUMENTS 4,316,285 2/1982 Bobilin et al. .................... 375/116

FOREIGN PATENT DOCUMENTS 0301481 2/1989 European Pat. Off. .
2721764 8/1978 Germany .

OTHER PUBLICATIONS

Proceedings IEEE Global Telecommunications Conference, vol. 2, pp. 895–902, Nov. 15, 1987, A. Miles, "Digital Performance Monitoring System".

Radio and Electronic Engineer, vol. 54, No. 2, pp. 97–106, Feb. 1, 1984, P. Huckett, "Performance Evaluation in an ISDN–Digital Transmission Impairments".

Primary Examiner—Stephen Chin
Assistant Examiner—Young Tse
Attorney, Agent, or Firm—Oblon, Spivak, McClelland, Maier & Neustadt

[57] ABSTRACT

The invention relates to a clock slip or drift counting process and apparatus, particularly for 2 Mbit MIC links consisting of using two detection modules (30,40) for frame locking words functioning as relays for incrementing a clock slip counter (80) on the basis of fixed frame locking loss and resumption criteria.

11 Claims, 5 Drawing Sheets

CLOCK SLIP COUNTING PROCESS AND APPARATUS

BACKGROUND OF THE INVENTION

The present invention relates to an apparatus for counting clock slips or drifts on digital transmission links such as satellite links, cable links or radio links.

The digital flow rates presently encountered on such links are 2,8,34 and up to 140 Mbit/s as a function of the link and sometimes more, or different values in the case of US standards, namely 1.5,6,45 Mbit/s, etc.

The informations transmitted for said links are time multiplexed and are known as MIC links.

It is pointed out that a MIC link for a digital primary block, i.e. a 2 Mbit/s link, is in the form of frames T subdivided into time intervals IT, each frame having a time interval ITO reserved for frame synchronization, time intervals reserved for data (voice channels in this case) and sometimes a time interval IT16 reserved for signalling. The number of IT is 32.

An 8 Mbit/s frame is constituted by sectors, the sector I comprising a frame locking word FL. A 34 Mbit/s frame is also constituted by four sectors, the first starting with a frame locking word FL. A 140 Mbit/s frame is constituted by six sectors, the first starting with a frame locking word FL.

Only the structure of the 2 Mbit/s frame has the special feature of one frame locking word for two IT's. Thus, said word is constituted by seven bits contained in the ITO of a frame Tn and a second bit of the ITO of the frame Tn+1 (consecutive).

It is also pointed out that a clock slip or drift is the result of a fast or slow variation (drift) of the clock frequency of the digital primary block for a 2 Mbit/s link (of the secondary digital block for an 8 Mbit/s link, etc.). This drift leads to a jump or a doubling of bits causing a frame locking loss. It is also pointed out that a frame locking loss is not only due to clock slips, but also to other transmission errors.

It is known to carry out a clock slip count for 64 kbit/s and 2 Mbit/s links and several methods exist.

Reference can e.g. be made to a first method, which is the analog method consisting of using a time reference. This reference is obtained by means of a precision clock with which measurement takes place of the drift of the clock of the primary digital block (block corresponding to the 2 Mbit/s link). Although this method is very accurate it is expensive as regards costs and equipment. Reference can be made to the article "Frequency and Time" by Rohde & Schwartz—info 001 104 E-1 for further details.

Reference is also made to a second, digital method. It consists of inserting a pseudorandom sequence into the frame, which makes it necessary to reserve one IT for said sequence. A reception analysis of said IT is carried out to establish whether or not there has been a slip.

This method suffers from the disadvantage of requiring complicated means and also of not being transparent on transmission. Therefore, it leads to the loss of one IT for useful information transmission, said IT being reserved for the pseudorandom sequence. Further details are provided in the CCITT G822 recommendation.

Another method is known which involves testing consisting of carrying out a life data analysis (LDA) and inter alia makes it possible to perform clock slip measurements. This procedure consists of using two test equipments. A first equipment receives the transmitted signal and analyses it for transmitting a check list by a data link to the second equipment, which receives said list and the informations of the transmission line. This second equipment also produces a check list and compares it with that which it has received.

This method suffers from the disadvantage of requiring two equipments and a data link.

The present invention aims at obviating these disadvantages.

The present invention more specifically relates to a process for counting clock slips in a digital transmission link constituted by frames (or sectors) indicatable by a frame locking word, characterized in that it involves the following stages;

initiating a first detection of the frame locking words of the transmission link with comparison with a reference frame locking word, initiating a second detection of the frame locking words, time lagged compared with the first detection, as soon as an error has been detected by the latter, determination of the frame locking loss and resumption on the basis of predetermined criteria, counting clock slips when there has been a determination of a frame locking loss at the end of the first detection and a frame locking resumption at the end of the second detection.

According to a second feature of the process, the initiation of a second detection consists of comparing the content of the first IT of the frames succeeding one another with a reference frame locking word, detection taking place when identity exists.

According to a third feature of the process, the initiation of a second detection consists of seeking in the frame succeeding that for which there has been a detection of an error at the end of the first detection, the frame locking word by successive comparison of each content of IT with the reference frame locking word, detection taking place when identity exists.

According to a fourth feature of the process, the determination of the frame locking loss takes place when, at the end of the first detection, a given number n of errors has been obtained and a given number p of errors has been obtained at the end of the second detection, p being below n, a transmission error other than a clock slip being detected.

According to a fifth feature of the process, the determination of frame locking resumption takes place as soon as a frame locking word is detected during the second detection.

According to another feature of the process, in the case where the digital signal is a 2 Mbit/s signal, the frame locking word being constituted by the content of the ITO of an even frame Tn and the second bit of the ITO of the odd frame Tn+1, the determination of the frame locking loss taking place when three consecutive ITO of even frames are received with error and/or three consecutive ITO of odd frames received with errors and frame locking resumption takes place when at a given instant t1 there is the presence of a correct ITO of one frame Tn and then at the instant t2 the second bit of the ITO of the frame Tn+1 is correct and that at an instant t3, the ITO of the frame Tn+2 is correct.

The present invention also relates to an apparatus for counting the clock slips of a digital transmission link constituted by frames (or sectors) indicatable by a frame locking word, characterized in that it comprises:

first detection means for the frame locking words of the link, second detection means for frame locking words activated by the first means when said first means have detected an error on a frame locking word, means for the determination of the frame locking loss or resumption by first and second detection means, means for counting the clock slips activated by the frame locking loss and resumption determination means when, on the one hand, there has been a frame locking loss by the first detection means and, on the other hand, when there has been a resumption by the second detection means.

According to another feature, the apparatus also comprises means (1) for compensating line attenuations of the monitored digital signal.

According to another feature, the apparatus also comprises means (2) for transforming the coded signal received into a binary signal.

According to another feature, the first and second means (30,40) respectively constitute a first and a second frame locking seeking modules each having a general time base circuit (3,4).

According to another feature, the frame locking loss and resumption determination means comprise the first frame locking module (30), a bit counter (8), two synchronization modules (6,5), a frame locking word presence detection module (70) and a frame counting and storage module (60).

BRIEF DESCRIPTION OF THE DRAWINGS

The invention is described in greater detail hereinafter relative to non-limitative embodiments and with reference to the attached drawings, wherein show.

DETAILED DESCRIPTION OF THE DRAWINGS

The clock slip counting process and apparatus described relate both to 2 Mbit/s and to 8, 34 or 140 Mbit/s and higher, as well as to US standard transmission links.

In the following description, the practical embodiment given relates more specifically to a 2 Mbit/s link and reference is made to frames rather than sectors, but it must be understood that this is only a non-limitative example and that it is possible to transpose it to higher rate links or to links having a different rate without any particular difficulty being encountered.

According to a first aspect of the invention, the clock slip count takes place without intrusion in the transmission and consequently there is complete transparency. This count takes place on the basis of the monitored digital signal by sampling a small part of said signal and leading to no deterioration (sampling below 10%).

Figure 1:
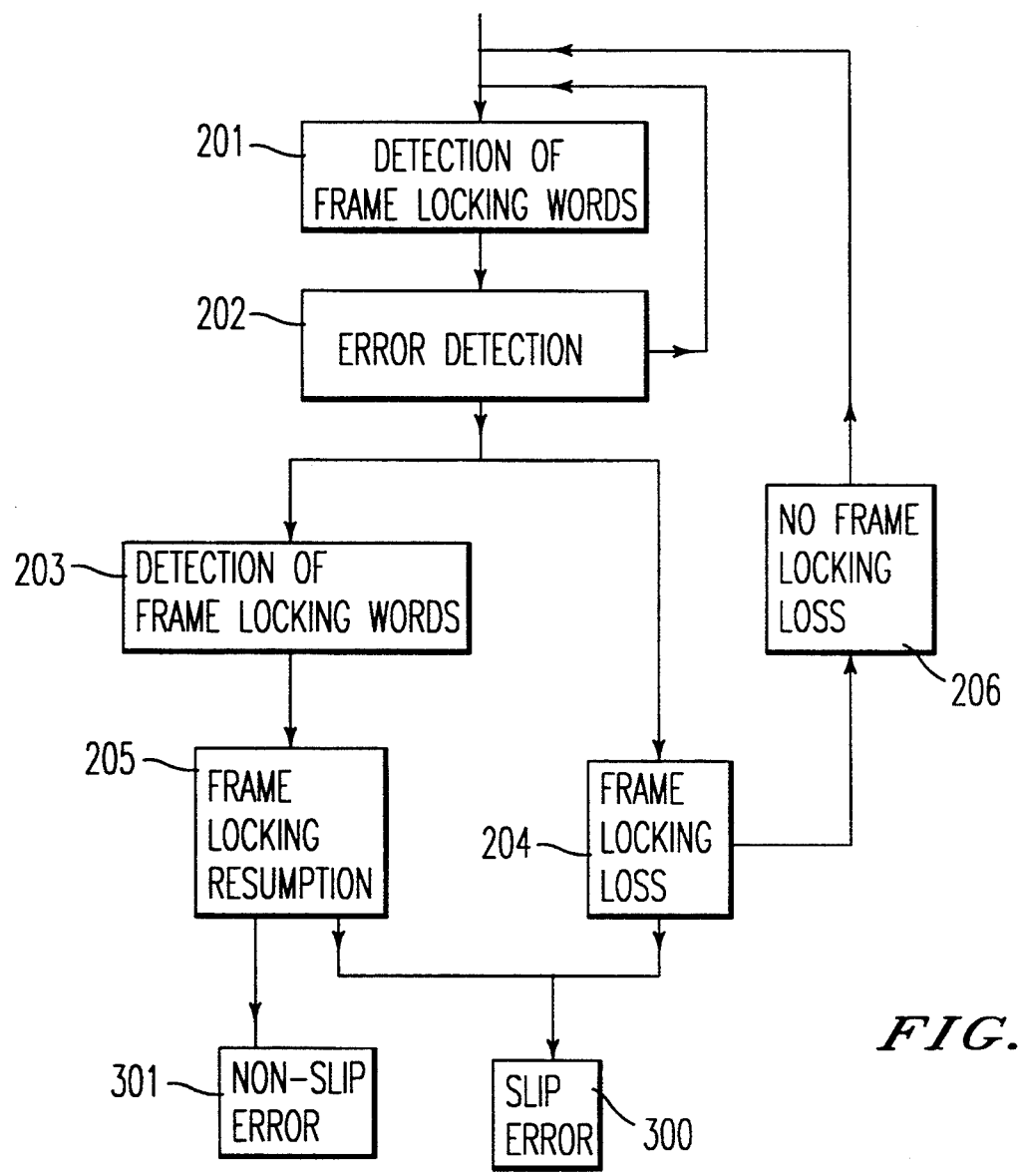
FIG. 1 the essential stages of the process according to the invention in the form of a succession of functional blocks.

Before said specific example, the process will firstly be described in more general terms as illustrated by the diagram of FIG. 1.

The clock slip counting process according to the invention is based on a double detection of frame locking words (blocks 201, 203, FIG. 1), which are time-displaced, the second detection being initiated as soon as an error has been detected (block 202, FIG. 1) on a frame locking word FL at the end of the first detection.

The term first detection means a phase of monitoring the content of the IT or IT's liable to have the frame locking word. A detection of the word FL takes place when at the end of the comparison there is identity between the content of said IT's and a reference frame locking word. The term second detection is understood to mean a phase of seeking the word FL in each IT of frames following the frame for which there has been an error detection during the first detection.

The process then consists, on the basis of preestablished frame locking loss and resumption criteria, of counting a clock slip when there has been a frame locking loss at the end of the first detection and resumption at the end of the second detection.

A first detection (block $20_1$, FIG. 1) of frame locking words is initiated, followed by a second detection (block 203, FIG. 1) as soon as an error has been detected at the end of the first detection. The frame locking loss and resumption criterion (block 205, FIG. 1) is fixed in the following way. There is a frame locking loss (block 204, FIG. 1) (hereinafter called FLL) when an error is detected on three successive frame locking words. There is a frame locking resumption (block 205, FIG. 1) (hereinafter called FLR) when in the meantime there has been a detection of at least one frame locking word.

The process according to the invention makes it possible to discriminate between transmission errors and clock slips because if there is no frame locking resumption at the end of the second detection, it is a transmission error other than a slip (block 301, FIG. 1). In the opposite case, there is a slip (block 300, FIG. 1).

Figure 2A:
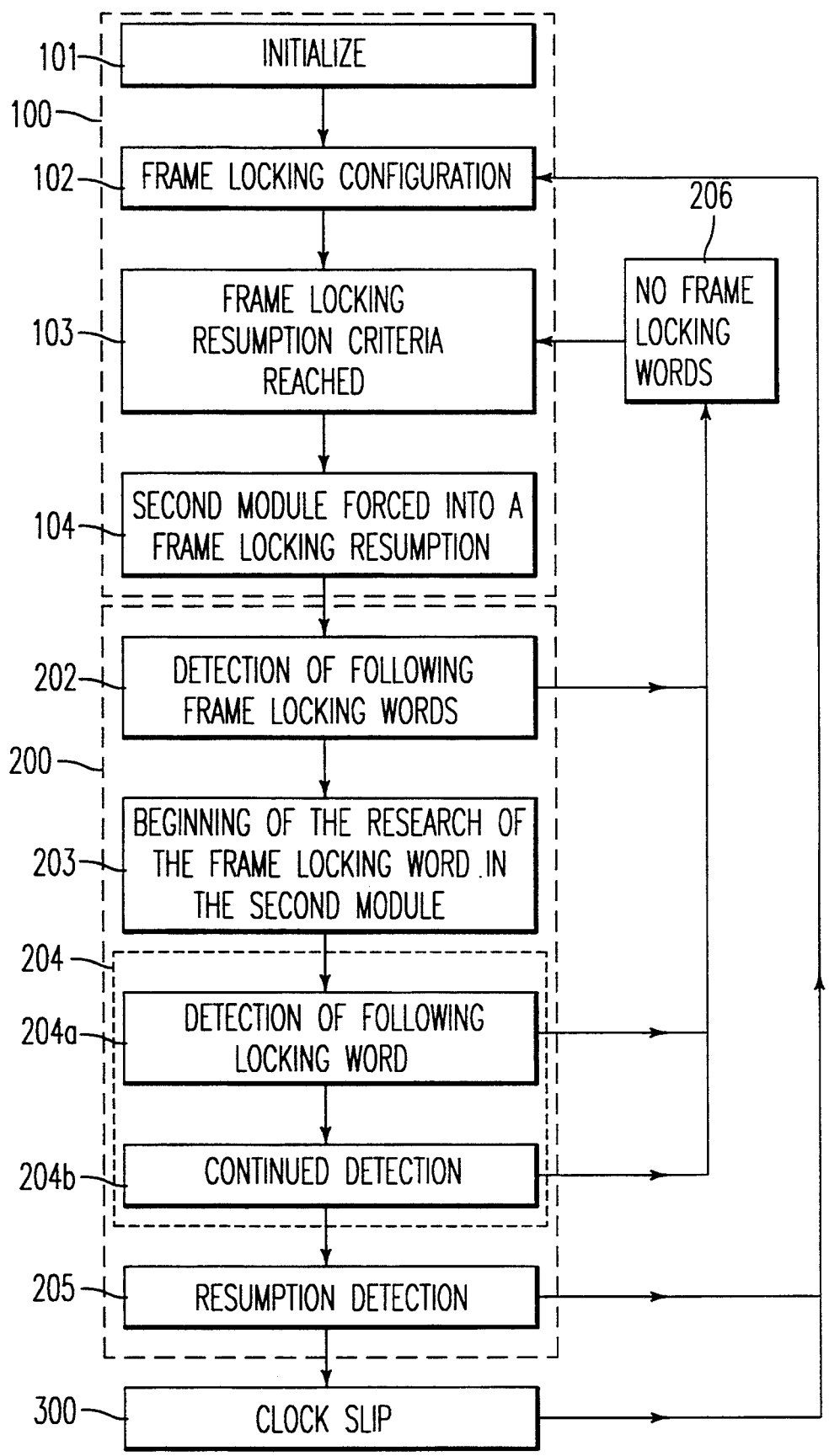
FIG. 2A the different stages in a more detailed manner.

Reference will now be made to the diagrams of FIGS. 2A and 2B. FIG. 2A illustrates in greater detail the process according to the invention as performed by the apparatus shown in FIG. 2B.

The process as performed involves an initialization stage 100 defined hereinafter. This stage firstly consists of making the apparatus life. The stage 102 indicates that the apparatus is in the frame locking configuration.

Figure 2B:
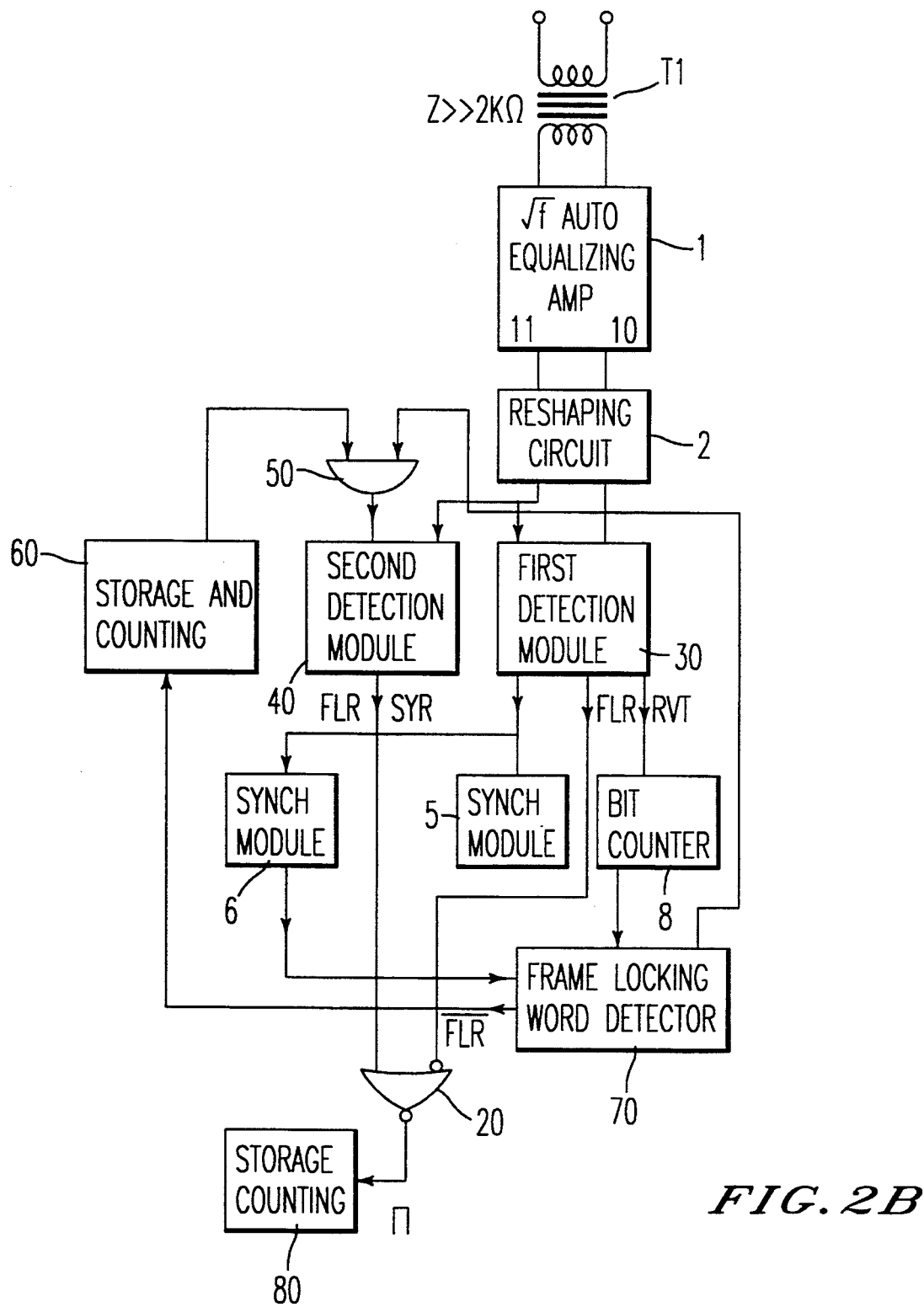
FIG. 2B a diagram of the apparatus according to the invention making it possible to perform the process.

Stage 103 indicates that the frame locking resumption criteria has been reached during the first detection stage performed by a first detection module 30 in FIG. 2B.

Stage 104 indicates that the frame locking resumption of the first module has forced a second module 40 into a frame locking loss configuration.

Stage 200 is broken down into the following substages:

when the first module detects a first error on a frame locking word (201), then:

the second module is activated for the detection in parallel of the following frame locking words (202), in accordance with the fixed frame locking criterion, the detection of the following locking word and the one after it are continued (204a, 204b) and when an error has been detected on these words, there is a frame locking loss—in the opposite case there is no frame locking loss (206), in parallel, if the second module has carried out a frame locking resumption by the detection of at least one of the frame locking words (not detected by the first module) (205), then there is a count of a slip, the first detected error corresponding to a clock slip (300), in the opposite case, there is a frame locking loss by the second module due to another transmission error type.

A more detailed description will now be given of the operational diagram of the apparatus according to the invention shown in FIG. 2B.

As can be seen in FIG. 2B, the counting apparatus is connected to a digital transmission line (2 Mbit/s) with monitoring by means of a transformer T1, which makes it possible to isolate the remainder of the apparatus from said line to which it is connected. As has been stated, this connection is non-intrusive (there is no deterioration of the monitored signal) and takes place either at the level of the digital distributor as indicated in the subsequently described FIG. 4, or by exchanging a junction card of a multiplexing frame by a card incorporating said apparatus.

Thus, as will also become apparent from the remaining description, said apparatus can be in the form of a single autonomous electronic card not requiring anything else of significance.

The apparatus has a circuit 1 shown in FIG. 2B which is a $\sqrt{f}$ auto-equalizing amplifier and which makes it possible to compensate line attenuation of the monitored signal. It also makes it possible to recover the reception clock or timing necessary for the reshaping of signals called HDB3+ and HDB3− which are fed to circuit 2 of FIG. 2B converting it into a binary signal. This binary signal is applied to the inputs of the frame locking modules, i.e. to the inputs of the first module 30 and the second module 40. The second frame locking module also receives the binary signal via an AND gate 50, which receives on its second input the output of a storage and counting circuit 60.

The first frame locking seeking module supplies a synchronization signal SYR, which is applied to two synchronization modules 5 and 6. The first and second frame locking seeking modules comprise a circuit able to detect frame locking resumption FLR or frame locking loss FLL.

The frame locking resumption FLR signal is applied to the input of a bit counter 8, whose output is applied to one of the inputs of a circuit 70 for detecting the presence of the frame locking word, which also receives the binary signal from the output of the circuit 2.

The circuit 70 for detecting the presence of the frame locking word makes it possible to carry out a comparison between the content of each time interval of the entering binary signal and a reference word, whose content corresponds to a frame locking word.

The comparison information is available at the output of said circuit 70, which will reset the counter 60 and prevent the passage of the entering binary signal to the second frame locking seeking module in the case where there is identity between said word and the entering information.

The FLR output of the second module 40 and the $\overline{FLR}$ output of the first module 30 are applied to the inputs of a logic NOR gate 20, which makes it possible to activate a storage counting system 80 in accordance with the state of said outputs.

Figure 3:
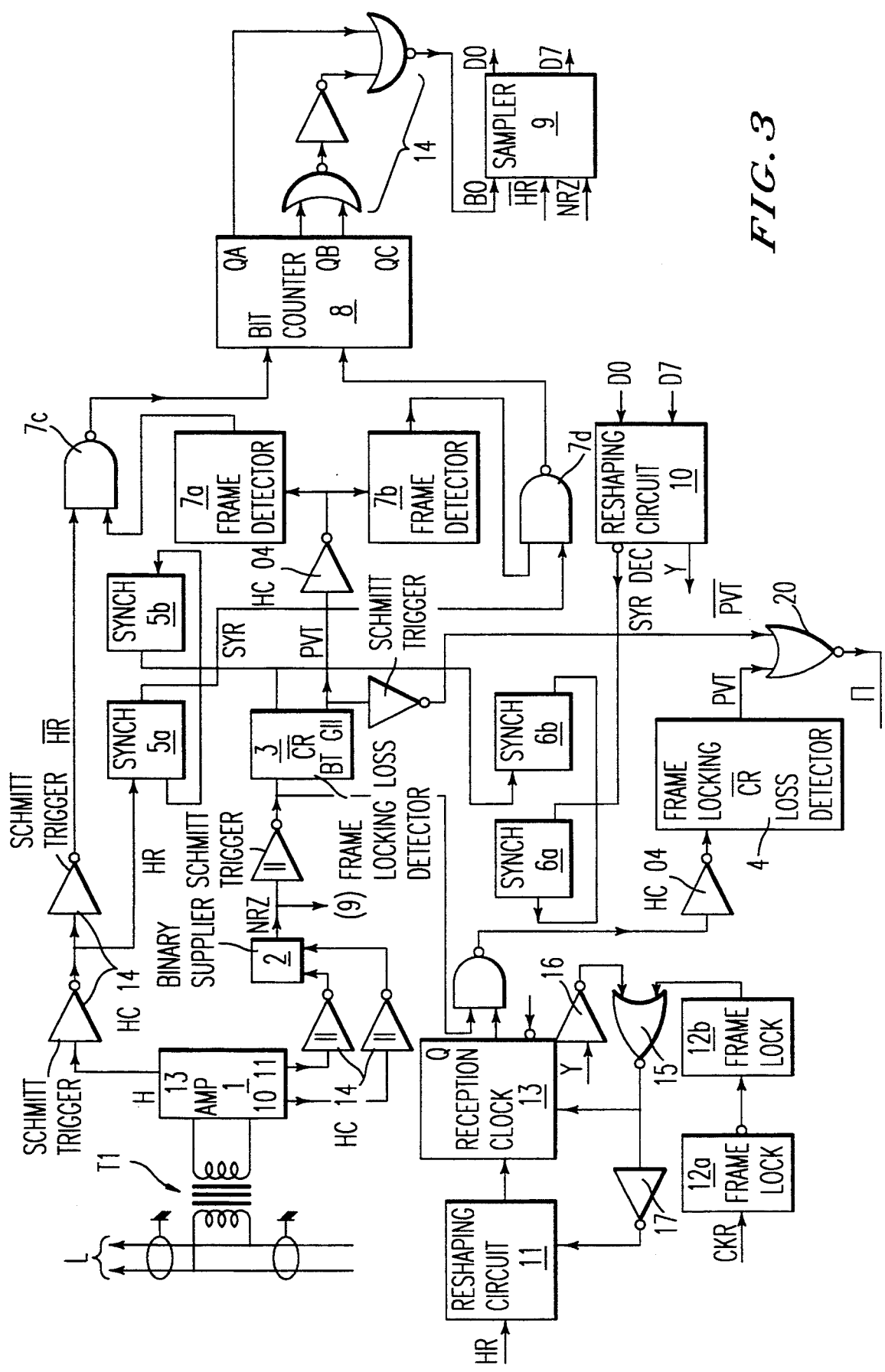
FIG. 3 a more detailed diagram of the apparatus according to the invention.

Reference should now be made to the diagram of FIG. 3, which corresponds to a special embodiment making it possible to carry out the counting of clock slips of a 2 Mbit/s digital transmission signal. In preferred manner, the apparatus is located on an electronic card, which is connected to the transmission line L.

This connection takes place by means of the transformer T1, the auto-equalizing amplifier 1 being a circuit CD 22301 which receives the attenuated signal and which also permits the recovery of the reception timing or clock necessary for the reshaping of the signals HDB3+ and HDB3− located at the outputs 10 and 11 of said circuit.

The reception clock appears at the output 13 of said circuit. This clock H is reshaped with the aid of the type HC14 Schmitt trigger circuit and at the outputs of said circuit is located the reception clock HR and the complementary reception clock $\overline{HR}$ (at MOS level HC).

The circuit 2 is of type CD 22103 which receives, following the passage into two Schmitt triggers HC 14, the output signals of the circuit 1. This circuit 2 supplies the binary signal NRZ, which is inverted by means of a Schmitt trigger HC14 and which reaches the input $\overline{CR}$ of the circuit 3. The latter is a type BTG2 circuit. The binary signal also arrives on a pin of a NAND circuit, whereof the output is applied to the input of an inverter, said two gates forming the gate 50 in FIG. 2B.

The circuits 5 and 6 in FIG. 2B are in each case constituted by HC4015-type circuits. Thus, in FIG. 3, the circuit 5 is constituted by the circuits 5a and 5b and the circuit 6 by the circuits 6a and 6b. These circuits shift the signal SYR from the circuit 3.

The type HC74 circuits 7a and 7b and the gates 7c, 7d make it possible to detect the frame locking loss or resumption and authorize or not the bit counter 8 of type HC191 to count the entering bits. The outputs QA,QB,QC of said counter are decoded by a means 14 formed from two NOR gates and an inverter and which supply the TOP BO, which is synchronous with each bit 0 of the entering signal.

The type circuit 9 samples, by means of the reception clock, the entering binary signal NRZ (in series) and converts it into parallel data D0 to D7 by means of the aforementioned TOP BO. Each time interval follows with a timing of 4 μs on the inputs D0 to D7 of said circuit.

For the synchronization time SYRDEC (from the circuit 6), each IT is compared by the circuit 10 with the nominal content of an ITO. The comparison information is available at the output Y of said circuit 10, which makes it possible to reset the flip-flop D, circuit 13 and the 512 bit counter, circuit 11. This information also makes it possible to prevent the passage of an entering binary signal to the circuit 4.

The circuit 70 in FIG. 2B is constituted by the circuits 9,10, 12A,12B,15,16 and 17 in FIG. 3. The circuit 60 in FIG. 2B is formed by the circuits 11 and 13 in FIG. 3.

The circuit 12 detects the lack of timing, because it detects the lack of information or transition on the signal CKR, which is the OR of the entering signals HDB3+ and HDB3−. This makes it possible to avoid certain untimely initiations during signal absence at the input.

Slip decoding takes place by the NOR gate 20 receiving on its inputs the signals FLL and $\overline{FLL}$ of the modules 3 and 4.

When there is no entering signal, on making the two circuits 3 and 4 life they are in the frame locking loss configuration (FLL), i.e. the FLL input of each of these circuits is in state 1.

As soon as a signal is received on pin $\overline{CR}$ of the circuit 3, it is analysed by the latter. The circuit 4 still does not receive the binary signal and this lasts for a few milliseconds. Thus, the circuit 3 resumes its frame locking and the associated input FLL assumes the value 0 and the normal decoding of the ITO forces the circuit 4 into FLL.

When an error appears on the frame locking word, the information Y from the circuit 10 no longer exists and the flip-flop D (circuit 13), as well as the 512 bit counter, circuit 11, are not reset at the end of 512 bits, i.e. at the end of two frames Tn and Tn+1. The NAND gate allows the entering binary signal to pass to the circuit 4, which then starts to analyse said signal. Two cases can then occur:

case 1: there is no other error on the ITO and then the system resumes the waiting configuration, i.e. the new ITO (even) received supplies a TOP, which erases the content of the flip-flop D and the 512 bit counter and initializes the slip detection circuit;

case 2: another error FL occurs on the even ITO, the circuit 3 has not yet detected a frame locking loss, because, on the basis of the established criterion, it is necessary to have three consecutive erroneous frame locking words (even ITO).

If there is in fact a slip, the frame locking word is received in incorrect form, becaue the circuit 3 does not wait for it at the point where it is located, but circuit 4 will detect it. However, if there is an error of the frame locking due to a transmission error other than a slip, the circuit 4 will not detect the presence of the frame locking word.

Three cases can then occur:

Case a: There is no longer an error on the even word ITO and then there is reinitialization of the complete apparatus.

Case b: There is no other error on the frame locking word (even ITO), so that it is a transmission error. The two circuits 3 and 4 are in a frame locking loss configuration. There is no slip detection. The resumption takes place normally as soon as a correct even ITO appears.

Case c: There is a slip, so that the circuit 3 does not await the even ITO at the location which it normally has. It detects a third error FL, which leads to the setting to 1 of the FLL output of said circuit. However, the circuit 4 recieves its second consecutive correct even ITO (as well as the control bit of the odd ITO) and its FLL output then passes from 1 to 0 until the circuit 3, after reinitiating a resynchronization sequence, has found the frame locking again. A slip pulse is then present at the output of the NOR circuit 20 (for the time that the FLL signal of the circuit 3 is equal to 1 and the FLL signal of the circuit 4 is equal to 0).

Figure 4B:
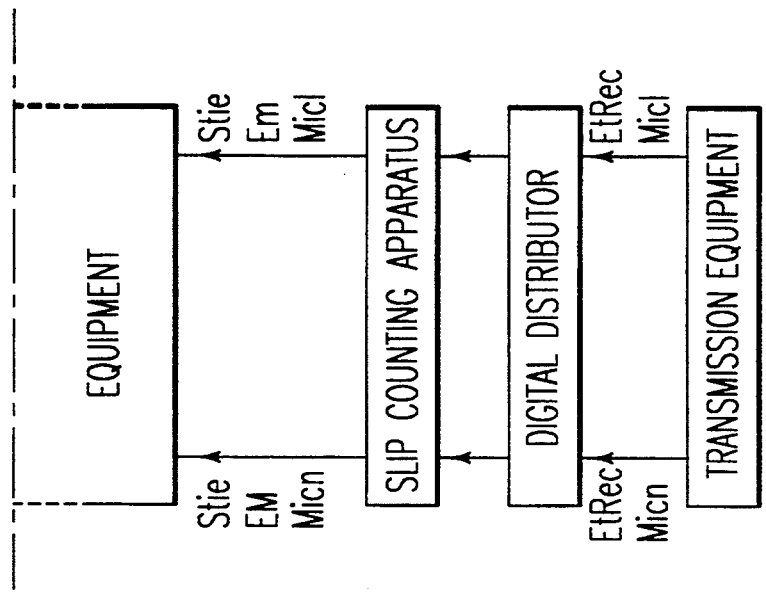
FIG. 4 the diagram of an overall view of the transmission equipment in which the apparatus is used.
Figure 4A:
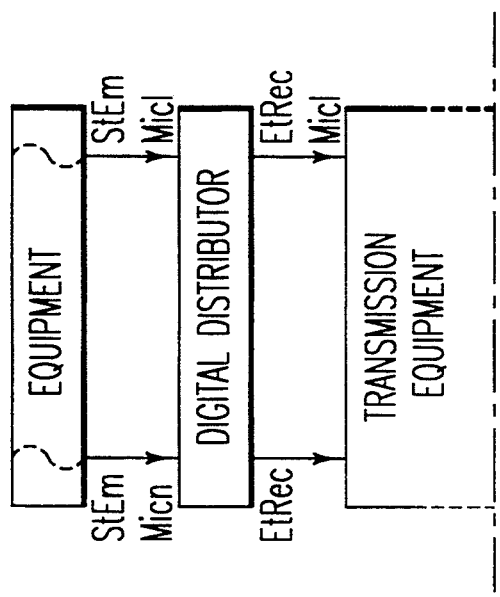

A description will now be given of the diagram of FIG. 4, which illustrates the placing of a counting apparatus according to the invention in a system for the transmission/reception of time-multiplexed, digital transmission signals.

Part A of the diagram shows a transmission system with transmission equipment, reception equipment and a digital distributor placed between these two equipments.

Part B of the diagram shows the system with on this occasion the installation of the clock counting apparatus, which is not in series on the path of the signals, but samples a small part of their energy. Sampling takes place at the 2 Mbit/s signal and is in accordance with the CCITT standard relating to protected inputs.

The invention claimed is:

1. A process for counting any clock slips in a digital transmission link wherein the transmission is constituted by frames (or sectors) indicatable by a frame locking word, comprising the steps of:
   initiating a first detection of the frame locking word of the transmission link with comparison with a reference frame locking word,
   initiating a second detection of the frame locking word, time lagged in comparison with the first detection of the frame locking word, upon the detection of an error at the time of the first detection,
   detecting a frame locking loss;
   determination of the frame locking loss and a resumption,
   counting clock slips when there has been a determination of a frame locking loss at the end of the first detection and a frame locking resumption at the end of the second detection.

2. The process according to claim 1, wherein the step of initiating the first detection further comprises the step of:
   comparing the content of the first time interval of the frames succeeding one another with the reference frame locking word.

3. The process according to claims 1 or 2, wherein the step of initiating the second detection further comprises the step of:
   seeking in the frame succeeding that for which there has been a detection of an error at the end of the first detection, the frame locking word by successive comparison of each content of time interval with the reference frame locking word.

4. The process according to claim 3 wherein:
   the determination of the frame locking loss takes place when, at the end of the first detection, a given number n of errors has been obtained and a given number p of errors has been obtained at the end of the second detection, p being below n, a transmission error other than the clock slips being detected.

5. The process according to claim 4 wherein the step of determination of frame locking resumption takes place as soon as the frame locking word is detected during the second detection.

6. The process according to claim 5 in which the digital signal of said digital transmission link is a 2 Mbit/s signal, the frame locking word being constituted by the content of the time interval for synchronization, called an ITO of an even frame Tn and the second bit of the ITO of the odd frame Tn+1, the determination of the frame locking loss taking place when three consecutive ITO of even frames are received with error and three consecutive ITO of odd frames received with errors and frame locking resumption takes place when at a given instant t1 there is a presence of a correct ITO of one frame Tn and then at the instant t2 the second bit of the ITO of the frame Tn+1 is correct and that at an instant t3, the ITO of the frame Tn+2 is correct.

7. A slip counting apparatus for counting the clock slips of a digital transmission link constituted by frames (or sectors) indicatable by a frame locking word, comprising:
   first detecting means for detecting the frame locking word of the data transmitted over said link,
   second detecting means for detecting frame locking word after activation by said first detecting means only when said first detecting means has detected an error on the frame locking word, means for the determination of frame locking loss other than the errors of a frame locking word, and means for a resumption coupled to said first and second detecting means, and means for counting the clock slips activated by the frame locking loss determination means and said resumption determination means when there is a frame locking loss detected by the first detecting means and a resumption by the second detection means.

8. The slip counting apparatus according to claim 7, further comprising:

means for compensating inline attenuations of an inputted digital signal in said digital transmission link.

9. The slip counting apparatus according to claims 7 or 8, further comprising:

means for transforming a coded signal received by said slip counting apparatus into a binary signal.

10. The slip counting apparatus according to claim 9 wherein:

said first and second detecting means respectively comprise a first and a second frame locking seeking modules each having a general time base circuit.

11. The slip counting apparatus according to claim 10, wherein said frame locking loss determination and said resumption determination means each comprises:

a first frame locking module, a bit counter, two synchronization modules, a frame locking word presence detection module and a frame counting and storage modules.

* * * * *